3,211,698  
POLYMERIC CHELATES OF BIVALENT METALS AND TRIS(HYDROXYARYL)-S-TRIAZINES  
Iral B. Johns, Marblehead, and Harry R. Di Pietro, Watertown, Mass., assignors to Monsanto Research Corporation, St. Louis, Mo., a corporation of Delaware  
No Drawing. Filed July 13, 1961, Ser. No. 123,637  
19 Claims. (Cl. 260—47)

The present invention relates to polymeric organometallic compounds and more particularly provides new and valuable chelates of metal ions and certain hydroxyaryltriazines.

An object of the invention is to prepare highly heat-resistant polymeric organometallic compounds. Another object of the invention is the provision of moldable compositions having very good thermal stability. Still another object of the invention is the provision of hard, compression molded compositions having a high degree of resistance to extreme conditions of temperature and pressure. A further object of the invention is the provision of methods for the preparation of compositions which can be cast, molded or extruded to give solvent resistant, thermally stable products.

These and other objects hereinafter disclosed are provided by the invention wherein there are prepared polymeric chelates of bivalent, tetracoordinating metals and a tris(hydroxyaryl)-s-triazine having at least one hydroxy radical in the ortho-position and from 6 to 12 carbon atoms in the aryl radical. Mono- or di-ethers and/or esters of said tris-hydroxy compounds may be used instead of the tris(hydroxyaryl)-s-triazines. More particularly, the invention provides compounds which consist essentially of a unit selected from the class consisting essentially, when the aryl group isphenyl, of the repeating unit (I):

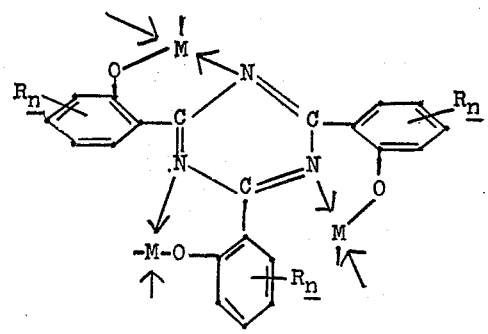

and the repeating unit (II):

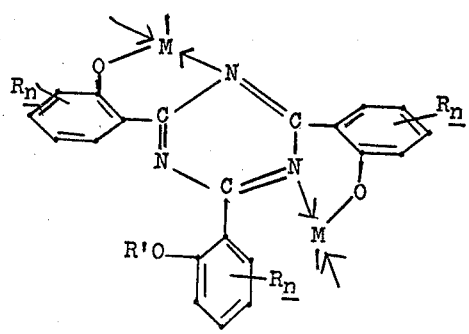

and the repeating unit (III):

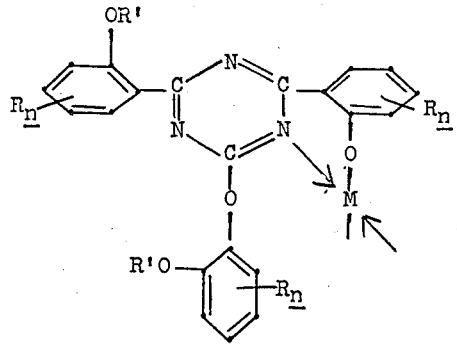

wherein R is selected from the class consisting of alkyl radicals of from 1 to 5 carbon atoms, alkoxy and alkoxyalkoxy radicals of from 1 to 6 carbon atoms, and phenoxy and phenoxyphenoxy radicals and such radicals having an alkyl radical of from 1 to 5 carbon atoms substituted at a benzene ring thereof; R' is selected from the class consisting of hydrogen, alkyl radicals of from 1 to 5 carbon atoms, the phenyl and phenoxyphenyl radicals and such radicals having an alkyl radical of from 1 to 5 carbon atoms substituted at a benzene ring thereof, alkanoyl radicals of from 2 to 6 carbon atoms, the benzoyl radical and alkylbenzoyl radicals having from 1 to 5 carbon atoms in the alkyl radical; M is a bivalent, tetracoordinating metal ion; $n$ is a number of 0 to 2; and each depicted dangling valence bond is satisfied by linkage to an oxygen atom of one of the repeating units (I)–(III), and each depicted dangling coordinate bond is satisfied by linkage to a nitrogen atom of the repeating units (I)–(III).

In the above Formulas I–III the benzene rings depicted therein may be other aromatic nuclei instead of the benzene rings, e.g., naphthalene, fluorene or biphenyl structures. Generally, any aromatic hydrocarbon structure having from 6 to 12 carbon atoms can replace the benzene ring.

Preferably, the bivalent tetracoordinate metal ion is zinc, copper, beryllium, cadmium, manganese, tin, lead, magnesium, mercury, iron, cobalt, nickel, platinum, or palladium.

Polymeric chelates having the above depicted repeating units are prepared according to the invention, by the reaction of 2,4,6-tris(2-hydroxyaryl)-s-triazine or the above mentioned derivatives thereof with an oxide or salt or acetylacetonate of a bivalent tetracoordinating metal. They may also be prepared by the reaction of (1) the salt of said metal and a 2-hydroxyaryl nitrile with (2) the free hydroxy nitrile or with an ether of the said nitrile.

We have found that 2,4,6-tris(2-hydroxyaryl)-s-triazine and the derivatives thereof which are herein disclosed are powerful coordinating ligands, each ortho-positioned hydroxy radical providing a site for coordination. Thus, depending upon the ortho-hydroxy content of the triazine compound, and the nature and available quantity of the tetracoordinating metal, compounds are provided wherein an ion of the metal is held at from 1 to 3 sites. The rigidity of the chelates forbids coordination of one metal ion by 2 sites in the same ligand molecule. Thus, the products are polymeric. For example, when beryllium is the metal ion and the triazine compound is 2,4,6-(2-hydroxyphenyl)-s-triazine, the chelate which is obtained in absence of a solvent is a highly cross-linked polymer consisting of the following type of structural units:

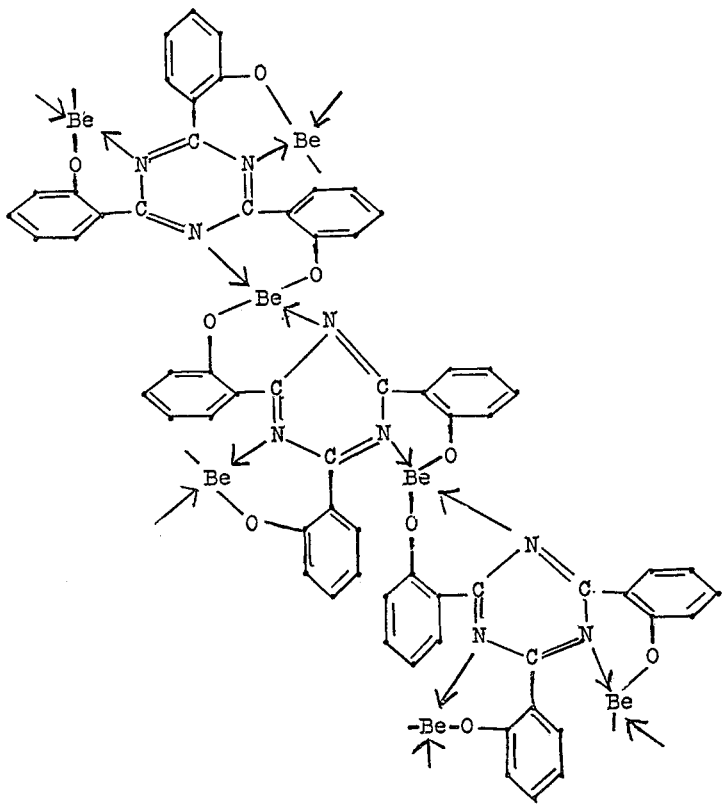

The above scheme shows the beryllium to triazine ratio to be 1.5:1, i.e., 3/2 of a beryllium atom are required to satisfy the chelation requirements of the 2,4,6-tris(2-hydroxyphenyl)-s-triazine. Such polymers consist of the unit (I), above.

Depending upon the reaction conditions, the 2,4,6-tris(hydroxyphenyl)-s-triazine may react at only two sites. Thus, a chelation reaction effected with, e.g., zinc-acetate dihydrate in the presence of a solvent for the triazine will give polymeric compounds in which there is present a 1:1 zinc-triazine ratio:

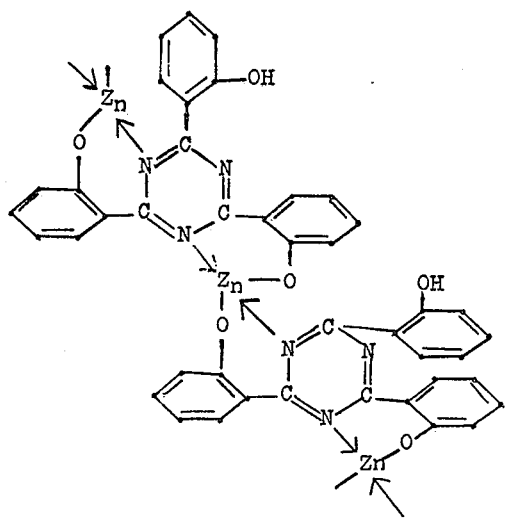

Such compounds consist of the unit (II) above, when R' is hydrogen.

Compounds which consist of the unit (II) above are obtained also when one of the hydroxy radicals of the 2,4,6-tris(2-hydroxyphenyl)-s-triazine has been blocked, previous to reaction with the metal oxide or salt, by conversion to ether or ester. Thus, 2,4-bis(2-hydroxyphenyl)-6-(2-ethoxyphenyl)-s-triazine gives a copper chelate having the following type (II) units:

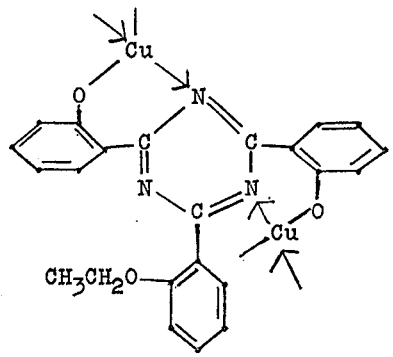

It will be noted that in the above structure the R' of the unit (II) formula is ethyl, i.e., the units have one ether group. Instead of blocking one hydroxy radical by conversion to an alkyl ether, the blocking may also be effected by conversion to an aryl ether, e.g., a phenyl or tolyl ether or by conversion to the p-phenoxyphenyl ether or a nuclearly alkylated phenoxyphenyl ether. The blocking can also be effected by esterification, e.g., by reacting 2,4,6-tris(2-hydroxyphenyl)-s-triazine with a hydrocarbon mono-carboxylic acid or acyl halide or anhydride thereof such as propionyl chloride, butyric acid, acetic anhydride, benzoic anhydride or 2-toluoyl bromide. The compounds obtained from the resulting 2,4-(2-hydroxyphenyl)-6-(2-acyloxyphenyl)-s-triazine and an oxide or salt of a coordinataing metal thus consist of the unit (II), with R' being an acyloxy radical.

Chelates are also obtained when only one hydroxy radical is available in the triazine compound, e.g., when there are employed the 2,4-bis(2-hydroxycarbyloxyphenyl)-6-(2-hydroxyphenyl)-s-triazines, the 2,4-bis(2-hydrocarbyloxyhydrocarbyloxyphenyl)-6-(2 - hydroxyphenyl)-s-triazines or the 2,4-bis(2-acryloxyphenyl)-6-(2-hydroxyphenyl)-s-triazines or derivatives thereof in which the phenyl radical is substituted by alkyl, phenoxy or phenoxyphenoxy radicals or such radicals in which a benzene ring thereof is substituted with one or two lower alkyl radicals. The reaction of a cadmium salt or oxide with a triazine compound in which two hydroxy radicals are blocked, e.g., 2,4-bis(2-phenoxyphenyl)-6-(2-hydroxyphenyl)-s-triazine gives a chelate consisting of the units (III), where R' is the phenyl radical, i.e.,

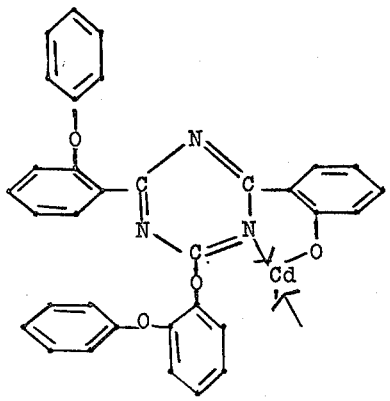

When only one hydroxy group is present in the triazine compound, the chelates are obviously dimeric.

The tris(2-hydroxyaryl)-s-triazines are readily obtainable by the trimerization of the nitrile or amide of an o-hydroxy-substituted aromatic mono-carboxylic acid. For example, as described by Cousin and Volmar, Bull. Soc. Chim. (4), 15, 416 (1914), upon heating salicylamide at 260–270° C., 2,4,6-tris(2-hydroxyphenyl)-s-triazine is obtained. The alkyl-substituted salicylamides are similarly converted to the 2,4,6-tris(alkyl-2-hydroxyphenyl)-s-triazines, e.g., trimerization of 2,3-, 2,4-, 2,5- or 2,6-cresotamide yields 2,4,6-tris(3- or 4- or 5- or 6-methyl-2-hydroxyphenyl)-s-triazine and similarly the trimerization of 4,5-, 4,6- or 5,6-diethylsalicylamide yields 2,4,6-tris (4,5- or 4,6- or 5,6-diethyl-2-hydroxyphenyl)-s-triazine. Presently useful tris(hydroxyaryl)-s-triazines wherein the aryl group is naphthyl, fluorenyl or biphenylyl are prepared by reaction of cyanuric chloride with the appropriate hydroxy compound, e.g., β-naphthol, 2-phenylphenol or 2-fluorenol. Thus, employing the process generally described in the Fritsche et al. patent No. 1,566,742, reaction with β-naphthol gives the presently useful tris(2-hydroxynaphthyl)-s-triazine. Compounds having less than three ortho-hydroxy radicals can be used to give products having the repeating units (II) and (III) where the benzene ring is replaced by another aromatic nucleus.

Presently useful mono-alkyl ethers of the 2,4,6-tris,2-hydroxyaryl)-s-triazines are disclosed in our copending application Serial No. 123,663 filed of even date, now U.S. Patent No. 3,113,942, e.g., 2,4-bis(2-hydroxy-4-methylphenyl)-6-(2-methoxy-4-methylphenyl)-s-triazine which is obtained by reaction of 1 mole of dimethyl sulfate with 1 mole of 2,4,6-tris (2-hydroxy-4-methylphenyl)-s-triazine;
2,4-bis(2-hydroxyphenyl)-6-(2-propoxyphenyl)-s-triazine by reaction of 1 mole of dipropyl sulfate with 1 mole of 2,4,6-tris(2-hydroxyphenyl)-s-triazine;
2,4-bis(2-hydroxyphenyl)-6-(2-pentyloxyphenyl)-s-triazine by reaction of 1 mole of dipentyl sulfate with 1 mole of 2,4,6-tris(2-hydroxyphenyl)-s-triazine;
2,4-bis(2-hydroxy-3-n-propylphenyl)-6-(2-butoxy-3-n-propylphenyl)-s-triazine from 1 mole of dibutyl sulfate and 1 mole of 2,4,6-tris(3-n-propyl-2-hydroxyphenyl)-s-triazine;
2,4-bis(3,5-diisopropyl-2-hydroxyphenyl)-6-(3,5-diisopropyl-2-ethoxy-s-triazine from 1 mole of diethyl sulfate and 1 mole of 2,4,6-tris(3,5-diisopropyl-2-hydroxyphenyl)-s-triazine;
2,4-bis(2-hydroxyphenyl)-6-(ethoxyphenyl)-s-triazine from 1 mole of diethyl sulfate and 1 mole of 2,4,6-tris(2-hydroxyphenyl)-s-triazine;
2,4-bis(2-hydroxy-3-butylphenyl)-6-[2-methoxy-3-butylphenyl]-s-triazine from 1 mole of dimethyl sulfate and 1 mole of 2,4,6-tris(2-hydroxy-3-butylphenyl)-s-triazine;
2,4-bis(2-hydroxy-4-pentylphenyl)-6-(2-methoxy-4-pentylphenyl)-s-triazine from 1 mole of dimethyl sulfate and 1 mole of 2,4,6-(2-hydroxy-4-pentylphenyl)-s-triazine, etc.

Reaction of the 2,4,6-(2-hydroxyaryl)-s-triazine with the dialkyl sulfate takes place readily at ordinary, decreased, or moderately increased temperatures in an aqueous alkaline medium, e.g., in the presence of an aqueous and/or alcoholic alkali metal hydroxide, i.e., sodium, potassium, lithium, rubidium or cesium hydroxide.

Dialkyl ethers of the 2,4,6-tris(2-hydroxyaryl)-s-triazine compounds, prepared, e.g., by reaction of the alkali metal salts of the hydroxy triazines with alkyl halides, are useful for preparing the dimeric chelates, e.g., the cobalt chelate of 2,4 - bis(2 - ethoxyphenyl) - 6 - (2 - hydroxphenyl) - s-triazine or the zinc chelate of 2,4-bis(2-octyloxyphenyl)-6-(2-hydroxyphenyl)-s-triazine or the tin chelate of 2,4-bis(2-methoxy-3-pentylphenyl)-6-(2-hydroxy - 3 - pentylphenyl)-s-triazine.

Benzenoid ethers of the 2,4,6-tris(2-hydroxyphenyl)-s-triazines which are useful for the present purpose and the method of preparing them are disclosed in our copending application Serial No. 123,640 filed of even date, now U.S. Patent No. 3,113,940, e.g., 2,4-bis(4-methyl-2-phenoxyphenyl)-6-(2-hydroxy-4-methylphenyl)-s-triazine which is obtained by reaction of 2 moles of iodobenzene with 1 mole of the trisodium salt of 2,4,6-tris(2-hydroxy-4-methylphenyl)-s-triazine;
2,4-bis(2-p-tolyloxyphenyl)-6-(2-hydroxyphenyl)-s-triazine by reaction of 2 moles of p-bromotoluene with 1 mole of the tripotassium salt of 2,4,6-tris(2-hydroxyphenyl)-s-triazine;
2-(2-o-pentylphenoxyphenyl)-4,6-bis(2-hydroxyphenyl)-s-triazine by reaction of 1 mole of o-iodopentylbenzene with 1 mole of the trilithium salt of 2,4,6-tris(2-hydroxyphenyl)-s-triazine;
2,4-bis[2-(4-phenoxyphenoxy)-3-n-propylphenyl]-6-(2-hydroxy-3-n-propylphenyl)-s-triazine from 2 moles of 4-chlorophenyl phenyl ether and 1 mole of the tripotassium salt of 2,4,6-tris(3-n-propyl-2-hydroxyphenyl)-s-triazine;
2,4-bis(2-[4-(3-pentylphenoxy)-m-tolyloxy]-3,5-diethylphenyl) 6-(3,5-diethyl-2-hydroxy)-s-triazine from 2 moles of 4-chloro-3-pentylphenyl m-tolyl ether and 1 mole of the trisodium salt of 2,4,6-tris(3,5-diethyl-2-hydroxyphenyl)-s-triazine;
2,4-bis(2-hydroxyphenyl)-6-[2-(4-phenoxyphenoxy)phenyl)]-s-triazine from 1 mole of 4-iodophenyl phenyl ether and 1 mole of the tripotassium salt of 2,4,6-tris(2-hydroxyphenyl)-s-triazine;
2,4-bis(2-hydroxy-3-butylphenyl)-6-[2-(4-phenoxyphenoxy)-3-butylphenyl]-s-triazine from 1 mole of 4-bromophenyl phenyl ether and 1 mole of the trilithium salt of 2,4,6-tris(2-hydroxy-3-butylphenyl)-s-triazine;
2,4-bis(2-hydroxyphenyl)-6-(2-phenoxyphenyl)-s-triazine from 1 mole of bromobenzene and 1 mole of the tripotassium salt of 2,4,6-(2-hydroxyphenyl)-s-triazine, etc.

Reaction of the alkali metal salt of the 2,4,6-(2-hydroxyaryl)-s-triazine with the nuclearly halogenated aromatic compound to give said benzenoid ethers takes place readily by heating the halogenated compound with said salt at a temperature of, say, from 150° C. to 240° C. and in the presence of an inert diluent or solvent and a heavy metal catalyst, e.g., copper, cuprous or cupric chloride, bromide or iodide, etc.

Esterified 2,4,6-(2-hydroxyaryl)-s-triazines which are presently useful for preparing the presently provided chelates are disclosed in our copending application Serial No. 123,641, filed of even date, now U.S. Patent No. 3,113,941, e.g., 2,4-bis(4-methyl-2-propionyloxyphenyl)-6-(2-hydroxy-4-methylphenyl)-s-triazine which is obtained by reaction of 2 moles of propionic acid anhydride with 1 mole of 2,4,6-tris(2-hydroxy-4-methylphenyl)-s-triazine;

2,4-bis(2-toluoyloxyphenyl)-6-(2-hydroxyphenyl)-s-triazine by reaction of 2 moles of 2-toluoyl bromide with 1 mole of 2,4,6-tris(2-hydroxyphenyl)-s-triazine;

2-(2-butyryloxyphenyl)-4,6-bis(2-hydroxyphenyl)-s-triazine by reaction of 1 mole of butyryl chloride with 1 mole of 2,4,6-tris(2-hydroxyphenyl)-s-triazine;

2,4-bis[2-(4-ethylbenzoyloxy)-3-n-pentylphenyl]-6-(2-hydroxy-3-n-pentylphenyl)-s-triazine from 2 moles of 4-ethylbenzoic acid anhydride and 1 mole of 2,4,6-tris(3-n-pentyl-2-hydroxyphenyl)-s-triazine;

2,4-bis(2-hexanoyl-3-isopropylphenyl)-6-(2-hydroxy-3-isopropylphenyl)-s-triazine from 2 moles of hexanoyl bromide and 1 mole of 2,4,6-tris(3-isopropyl-2-hydroxyphenyl)-s-triazine;

2,4-bis(2-propionyloxyphenyl)-6-(2-hydroxyphenyl)-s-triazine from 2 moles of propionic acid anhydride and 1 mole of 2,4,6-tris(2-hydroxyphenyl)-s-triazine;

2,4-bis(2-hydroxy-4-ethylphenyl)-6-(2-benzoyloxy-4-ethylphenyl)-s-triazine from 1 mole of benzoyl bromide and 1 mole of 2,4,6-tris(2-hydroxy-4-ethylphenyl)-s-triazine;

2,4-bis(2-hydroxyphenyl)-6-(2-butyryloxypyhenyl)-s-triazine from 1 mole of butyric acid and 1 mole of 2,4,6-(2-hydroxyphenyl)-s-triazine;

2,4-bis(2-hydroxyphenyl)-6-(2-p-ethylbenzoyloxyphenyl)-s-triazine from 1 mole of p-ethylbenzoyl acid bromide and 1 mole of 2,4,6-(2-hydroxyphenyl)-s-triazine, etc.

Reaction of the 2,4,6-(2-hydroxyaryl)-s-triazine with the carboxylic acid compound takes place readily by contacting the acidic compound with said triazine at ordinary or increased temperature and in the presence of an inert diluent or solvent.

Also presently useful are the 2,4,6-tris[2-hydroxy(hydrocarbyloxy)aryl]-s-triazines or the 2,4,6-tris[2-hydroxy-(hydrocarbyloxyhydrocarbyl)aryl]-s-triazines, i.e., compounds in which there are present at the same aryl radical both the hydroxy and the ether group. The ether radical may be alkyl or benzenoid. Such compounds are readily available, starting from the 2,4,6-tris(2-hydroxyaryl)-s-triazines by first halogenating the aryl nucleus, e.g., by reaction with chlorine, bromine or iodine, whereby depending upon the quantity of halogen employed and the conditions under which the halogenation is effected, there are obtained the 2,4,6-tris[2-hydroxy(halo or dihalo)aryl]-s-triazines. Reaction of the monohalo or dihalo compounds with the stoichiometrically required quantity of an alkali metal alcoholate or phenate gives the 2,4,6-tris[2-hydroxy(hydrocarbyloxy)aryl]-s-triazine or the 2,4,6-tris[2-hydroxy(dihydrocarbyloxy)aryl]-s-triazines. Instead of employing the alcoholates, there may be employed the alkali metal salt of a mono-hydroxy ether, e.g., of 2-methoxyethanol or of 4-hydroxyphenyl phenyl ether. Thus, there are employed for the preparation of the present chelates compound which are obtained as follows: Three moles of potassium phenate reacted with one mole of 2,4,6-tris(2-hydroxy-4-iodophenyl)-s-triazine gives 2,4,6-tris(2-hydroxy-4-phenoxyphenyl)-s-triazine; six moles of sodium ethylate reacted with one mole of 2,4,6-tris(3,5 - dibromo - 2 - hydroxyphenyl)-s-triazine gives 2,4,6tris(2-hydroxy-3,5-diethoxyphenyl)-s-triazine; six moles of lithium or rubidium p-butylphenylate reacted with one mole of 2,4,6-tris(3,5-dibromo-2-hydroxy-4-propylphenyl)-s-triazine gives 2,4,6-tris[3,5-bis(4 - butylphenoxy)-4-propyl-2-hydroxyphenyl]-s-triazine; three moles of sodium or potassium 4-ethoxybutylate reacted with one mole of 2,4,6-tris(4 - bromo-2-hydroxyphenyl)-s-triazine gives 2,4,6-tris[2-hydroxy-4-(4 - ethoxybutoxy)phenyl]-s-triazine; six moles of the potassium or sodium alcoholate of 2-methoxyethanol reacted with one mole of 2,4,6-tris-[3,5-dibromo-2-hydroxy-4 - pentylphenyl)-s-triazine gives 2,4,6-tris[3,5-bis(2-methoxyethoxy)-2-hydroxy-4 - pentylphenyl]-s-triazine, etc.

Reaction of the halogenated 2,4,6-(hydroxyaryl)-s-triazine with the alkali metal phenate takes place readily by heating the halogenated compound with the phenate at a temperature of from, say, 150° C. to 240° C. in the presence of an inert diluent or solvent and a heavy metal catalyst, e.g., copper, cuprous or cupric chloride, bromide, iodide, etc., e.g., substantially as described in our copending application Serial No. 123,664 filed of even date, now U.S. Patent No. 3,113,943.

The presently provided polymeric chelates are prepared by reacting the above 2,4,6-tris(2-hydroxyaryl)-s-triazines or ether or ester derivatives thereof containing at least one hydroxy radical with a salt or oxide or acylacetonate of a tetracoordinating metal. Particularly valuable, owing to their easy availability, are the salts or the oxides or acylacetonate chelates of tetracoordinating metals such as copper, beryllium, magnesium, zinc, cadmium, mercury, tin, lead, palladium, platinum, manganese, iron, cobalt and nickel. The oxides of any of such metals or the organic or inorganic salts may be employed, e.g., copper bromide, beryllium chloride, zinc oxide, cobalt acetate, mercury sulfate, nickel propionate, lead butyrate, lead bromide, copper benzoylacetonate, magnesium acetylacetonate, iron acetylacetonate, manganese 4-toluoylacetonate, iron benzoylacetonate, ferrous bromide, cobalt oxalate, nickel sulfate, etc. The bivalent metal chlorides, bromides and iodides and the bivalent metal alkanoates of from 2 to 4 carbon atoms are generally preferred. Useful acylacetonates are generally alkanoylacetonates having from 1 to 4 carbon atoms in the alkanoyl radical, benzoylacetonates, and (alkylbenzoyl)acetonates having from 1 to 4 carbon atoms in the alkyl radical.

Reaction of the 2-hydroxyaryltriazine compound with the transition metal salt or oxide takes place readily, with production of either water or acid as by-product, depending upon whether the metal compound is an oxide or salt. Thus, formation of the chelate of tin and 2,4,6-tris(2-hydroxyphenyl)-s-triazine takes place substantially according to the following scheme (type I) when tin bromide is employed as the metal chelating agent in the absence of a solvent and in the stoichiometric quantity required for reaction at three hydroxy sites:

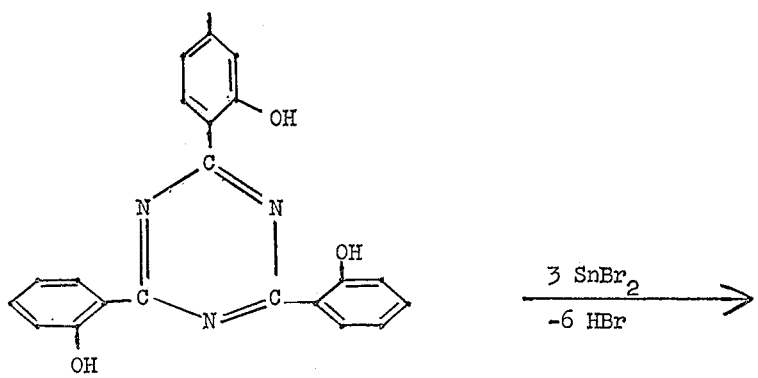

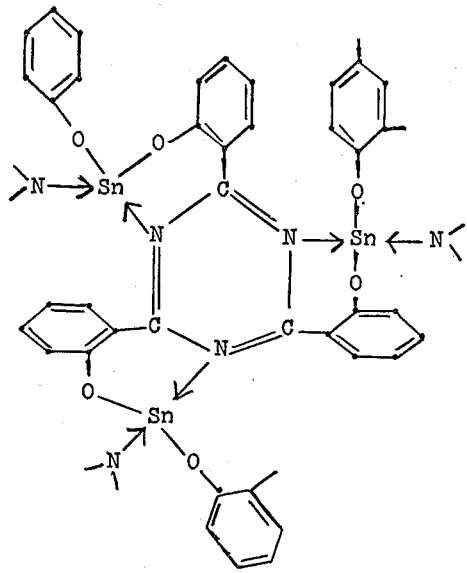

wherein the dangling valence of the phenyl radical leads to a carbon atom of the s-triazine ring and the N< indicates the triazine nucleus.

The extent of reaction will depend, of course, upon the quantity of available metal. The availability of the metal is regulated not only by the amount of metal compound which is mixed with the hydroxy triazine compound but with the degree to which the two reactants are exposed to each other. Thus, when reaction is conducted in the substantial absence of a solvent or diluent, whereby intimate contact of the metal compound and the hydroxyaryltriazine is facilitated, all three of the hydroxy radicals of the 2,4,6-tris(2-hydroxyaryl)-s-triazine react, i.e., the metal ion enters all three sites for coordination. However, when the chelate is prepared in a liquid medium which dissolves the triazine reactant but which is a non-solvent for the product, there is precipitated from the solution of reactants a chelate in which only two of the hydroxy radicals of the 2,4,6-tris(2-hydroxyaryl)-s-triazines have served as reaction sites. Apparently, in this case, precipitation of the chelate which is formed by reaction at the two sites hinders reaction at the third site.

When reaction has occurred at the three hydroxy radicals of a 2,4,6-tris(2-hydroxyaryl)-s-triazine the chelate is a cross-linked, highly insoluble and difficultly fusible polymer. Advantageous utilization of the cross-linked chelates is in fields wherein they can be prepared in situ, i.e., in bonding and laminating applications whereby the mixture of reactants is applied to filler or backing and reaction between the metal oxide or salt and the tris-hydroxy compound is subsequently completed in the presence or absence of extraneous heating and/or compression.

Reaction of the hydroxyaryltriazine ligand and the metal chelating agent, to form the presently provided chelates, takes place readily at ordinary, decreased or increased temperature. Generally, when reaction is effected in solution the chelate begins to form as a copious precipitate almost immediately upon contact of the two reactants, the use of extraneous heating being generally unnecessary except, perhaps, for the purpose of completing the reaction within less time than would be required in the absence of heating. The precipitated chelate is then simply filtered off, washed and dried. The yield of chelate is generally quantitative.

The present chelates can also be prepared by reaction of a 2-hydroxyarylnitrile with a metal salt of the same nitrile or of a different 2-hydroxyarylnitrile. When the reaction occurs in solution, the product is the same as that prepared by reacting a 2,4,6-tris(2-hydroxyaryl)-s-triazine with a metal oxide or salt in solution. Thus, the reaction of the cobalt salt of salicylonitrile with salicylonitrile to form the polymeric cobalt chelate is shown in the scheme below, wherein, for the sake of a better visualization of the reaction, plus symbols are omitted between moles of the reactants:

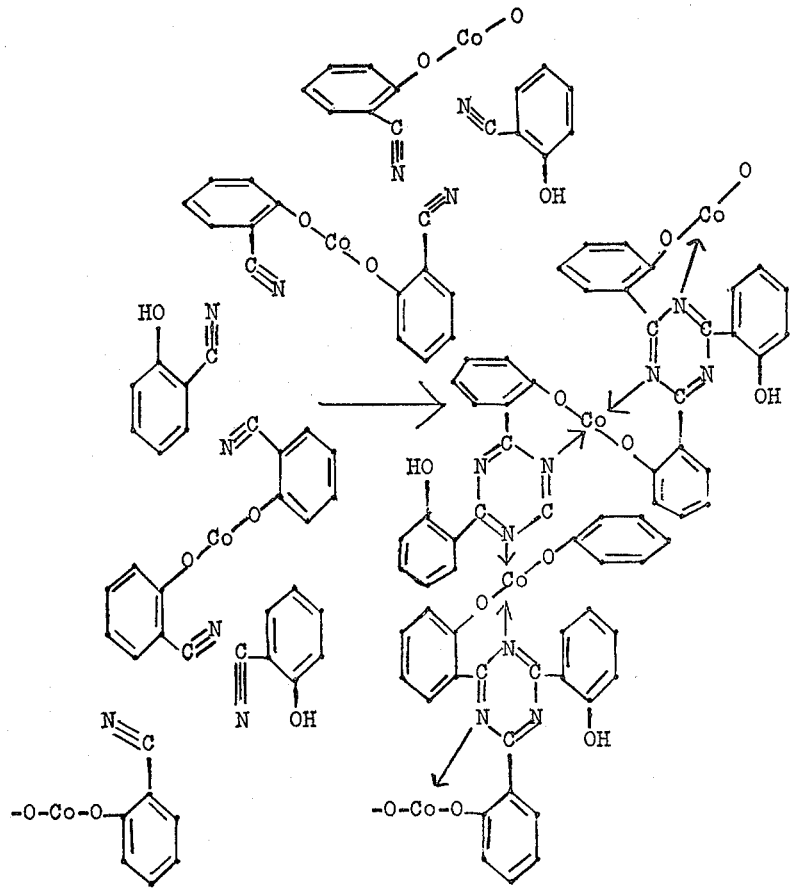

The dangling valences shown above lead to a benzene ring of the salt component.

Salts of the 2-hydroxyarylnitriles are available by reaction of a 2-hydroxyarylnitrile with a dialkyl metal, e.g., dipropyl beryllium, dimethyl cadmium or diethyl zinc, substantially as disclosed in our copending application Serial No. 123,662 filed of even date, now U.S. Patent No. 3,057,895, and according to the following reaction

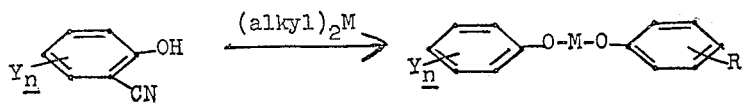

wherein Y is selected from the class consisting of hydrogen and alkyl and alkoxy radicals of from 1 to 5 carbon atoms and M is a bivalent, tetracoordinating metal ion.

The chelates can be formed from the metal salt and the nitrile in presence or absence of a solvent, as is the case when preparation is effected from the 2,4,6-tris(2-hydroxyaryl)triazines. Employing no solvent and having available in the reaction mixture at least 0.5 mole of the nitrile per mole of the metal salt, there are formed cross-linked polymeric chelates comprising the type (I) unit, also shown herein for the beryllium and tin chelates. This procedure is advantageous because it permits conducting preparation of the polymer in the mold. Thus, a mixture of the salt and of the free hydroxy nitrile in the stoichiometric amounts is charged to the mold, and the mixture is condensed to the polymeric, molded object under high pressure (5,000-10,000 atmospheres) and at a temperature of, say, 150° to 200° C.

Products of the type (II), where R' is a hydrocarbyl radical or a hydrocarbon acyl radical, are formed when the bivalent, tetracoordinating metal salt of a 2-hydroxyarylnitrile is reacted with a mixture of the free hydroxy nitrile and an ether or ester of the hydroxy nitrile using heat and pressure. In this case, the blocking of one of the hydroxy radicals in the mixture of the non-salt reactant results in avoiding the cross-linking which occurs when the free hydroxy nitrile is used in the absence of a solvent. Hence, reaction of the metal salt of the aromatic hydroxy nitrile with a mixture of the free nitrile and the ether or ester of said nitrile can be effected during molding to obtain the linear polymer, i.e., the salt is simply mixed with the ether or ester and the free hydroxynitrile and the mixture is compression molded. Useful ethers are the alkyl ethers having from 1 to 5 carbon atoms in the alkyl radical, the phenyl and phenoxyphenyl ethers and such ethers having an alkyl substituent of from 1 to 5 carbon atoms present at a phenyl radical, e.g., 2-methoxy-, propoxy-, butoxy- or pentyloxybenzonitrile; 2-(4-tolyloxy)benzonitrile, 2-phenoxy-4-ethylbenzonitrile, 2-p-butylphenoxybenzonitrile, etc.

Instead of blocking the hydroxy radical of the hydroxyarylnitrile by conversion to an ether, the blocking may also be effected by converting it to an ester, e.g., cyano esters such as the following are useful for reaction with the metal salts of the 2-hydroxyarylnitriles: the acetate, propionate, butyrate or valerate of salicylonitrile or of the alkyl derivatives thereof such as cresotonitrile.

When the metal salt of the 2-hydroxyaryl nitrile is reacted with an ether or ester of the hydroxy nitrile in absence of the free hydroxoy nitrile, the products are also those of type (II) when the reaction is effected under heat and pressure, with R' being selected from the class consisting of alkyl, aryl, alkanoyl, benzoyl and alkylbenzoyl radicals.

The presently provided polymeric chelates are characterized by a high degree of stability to heat and solvents, which stability may be ascribed not only to the presence of the metal but also to the triazine structure and the coordinate bonding. They are, therefore, of particular utility in the fabrication of hard, molded pieces destined to be used under conditions involving exposure to extreme heat and/or attack by solvents. Many of the polymers which are prepared either in the presence or absence of solvents are stable at temperatures which are well over 900° F. Accordingly, compression molding of the polymers presents a problem in that the standard molding equipment cannot be generally used with the very heat-resistant polymers. For example, the present extremely heat-resistant polymeric chelates can be molded by compressing the powdered polymers between electrically heated, hardened steel anvils at pressures of from 3,725 kg./cm.$^2$ to 30,000 kg./cm.$^2$. The necessity of using especially devised, high pressure molding apparatus is compensated for, of course, by the very unusual thermal properties of the molded pieces. This is particularly true for those of the polymeric chelates which are derived from those of the aryltriazines which have three free hydroxy radicals or those which are derived by reaction of a transition metal salt of a 2-hydroxyarylnitrile with a free 2-hydroxyarylnitrile.

The polymeric chelates which are obtained from the mono-etherified or the mono-esterified 2,4,6-tris(2-hydroxyaryl)-s-triazines and a transition metal oxide or salt are generally less thermally stable than are the cross-linked products, though these polymers also are characterized by possessing a higher degree of heat-stability than do the usual, commercially available polymers. The presently provided ether- or ester-containing chelates are much more easily compression molded than those which do not contain such groups, hence, these chelates are admirably suited as molding compositions for applications wherein temperatures of, say, above 200° C. are not anticipated. They are also advantageously employed in admixture with the more heat-resistant chelates; e.g., a mixture of the polymeric chelate prepared in solution from, say, zinc acetate and 2,4,6-tris(2-hydroxyphenyl)-s-triazine and a mixture of the polymeric chelate prepared from, say, copper propionate and 2,4-bis(2-hydroxyphenyl)-6-(2-octyloxyphenyl)-s-triazine can be compression molded at pressures and temperatures which are lower than those required for compression molding of said polymeric zinc chelate, alone. In addition, molded objects obtained from mixtures of the higher melting and the somewhat lower melting chelates are characterized by outstanding mechanical properties, e.g., they are less sensitive to impact than are those that are obtained from the ether- or ester-free polymeric chelates.

The presently provided polymeric chelates, generally, can be plasticized by intimately admixing them, previous to molding, with ethers or esters which are in themselves highly resistant to heat, e.g., polyphenyl ethers having from 4 to 5 benzene rings, esters of aromatic polycarboxylic acids, etc. Valuable molded objects are also obtained by compression molding of mixtures comprising one or more of the present polymeric chelates, a highly heat-resistant ether and ester, and a heat-resistant filler, e.g., asbestos fiber, silica, etc.

The presently provided dimeric chelates may also be admixed with the higher-melting polymeric chelates in order to modify the properties of the compression molded products. The dimeric chelates are also advantageously employed for a variety of other industrial uses, e.g., as anti-scorch agents in the manufacture of natural and synthetic rubber products and as extreme-pressure resisting additives for hydrocarbon oil lubricants. The dimeric chelates also find use as bactericides and fungicides.

The higher polymeric chelates can be prepared in the mold to give hard molded objects of well-defined dimension, or the powdered reactants, i.e., the hydroxyaryltriazine and metal oxide or salt, or the hydroxyarylnitrile and the metal salt thereof, can be impregnated into a porous, heat-resistant structure, and the impregnated structure submitted to heat and pressure for effecting polymerization of the mixture within the interstices of the structure. Likewise, for laminating use the mixture of reactants can be polymerized between the laminates. The polymeric chelates can also be extruded through slits or nozzles under high temperature and pressure conditions, or they may be cast or extruded from such solvents as N,N-dimethylformamide or the dialkyl sulfoxides to give, e.g., tapes, fibers or dimensioned cast objects.

The invention is further illustrated by, but not limited to, the following examples.

Example 1

Into a one-liter flask were placed 5 g. (0.014 mole) of 2,4,6-tris(2-hydroxyphenyl)-s-triazine and 350 ml. of N,N-dimethylformamide. The resulting mixture was heated until solution was complete and then cooled. A solution of 3.07 g. (0.014 mole) of zinc acetate dihydrate in 200 ml. of ethanol was added with stirring. A slight yellow precipitate formed instantly. The reaction was complete after the mixture was allowed to digest at 60° C. for one hour, with stirring. The yellow solid was separated by centrifuging, washed several times with 100 ml. portions of alcohol and dried under vacuum at 60° C. for several hours. The yellow zinc chelate, which was thus obtained in quantitative yield, did not melt at 500° C. and analyzed 14.95% Zn as against 15.54%, the calculated value for $C_{21}H_{13}N_3O_3Zn$. It thus consisted essentially of the repeating unit of the type (I) shown above, wherein R and R' are hydrogen. It was stable at 500° C. in the microisoteniscope, no measurable decomposition being noted at the end of one hour at this temperature.

The zinc chelate was molded in a Bridgman apparatus built for use at high temperature. The anvils of the apparatus were made of high speed steel, 3" in diameter and 3" long, tapered at one end at an angle of 65° to the central axis. The cones were truncated to give flat surfaces 3/8" in diameter. The anvils were equipped with heaters capable of raising the temperature to 450° C., and they were supported in a hydraulic press on water-cooled bases and were insulated from the bases by thick mica sheets. The maximum pressure attainable between the anvil faces was 37,500 kg./cm.²

An iron or brass ring having an internal diameter of 3/8" was placed on lower anvil to serve as a mold. A sample of the zinc chelate was placed in the ring and compressed to 14,000 kg./cm.² at room temperature in the apparatus. After the temperature of the anvils reached 300° C., the force was increased to give a pressure of 30,700 kg./cm.² between the anvils. The apparatus was allowed to cool under pressure. The hard, molded disc of zinc chelate thus obtained was translucent and glossy and of good color.

Using the above-described Bridgman apparatus, the zinc chelate was also molded in admixture with an extraneous heat-resistant material to study plasticizing effect. A mixture consisting of 1.5 g. of the zinc chelate and 0.3 g. of a mixture of isomeric 5-ring, polyphenyl ethers, B.P. ca. 515° C., was thoroughly stirred, heated overnight in an oven at 100° C. and then stirred again to a uniform, fine powder. The mixture was then placed into the brass ring mold of the apparatus and cured at about 300° C. and 5000 kg./cm.² The molded disc thus obtained was of good surface gloss and color. Testing of the molded piece for mechanical strength gave a break at 188 g. after elongation of 0.0087", employing the Instron Tensile Tester.

Example 2

Bis(2-cyanophenoxy)zinc(II) was prepared as follows: A mixture consisting of 4.8 g. of salicylonitrile and 60 ml. of benzene was warmed to solution under nitrogen, and there was added thereto, dropwise, 12 ml. of a 25% solution of diethyl zinc in benzene, while maintaining the reaction mixture in a nitrogen atmosphere. Ethane was evolved at a rapid rate as the diethyl zinc was added, and was carried off. The white solid which was immediately precipitated in the reaction mixture was rapidly filtered, with exclusion of moisture, washed with benzene and dried to give the substantially pure bis(2-cyanophenoxy)zinc (II) analyzing 19.93% Zn as against 21.68%, the calculated value for $C_{14}H_8N_2O_2Zn$.

The polymeric chelate of zinc and 2,4,6-tris(2-hydroxyphenyl)-s-triazine was prepared by compression molding of a mixture consisting of 0.3 g. of the zinc compound prepared above and 0.12 g. of salicylonitrile, employing the Bridgman apparatus described above at 200° C. and 12,750 kg./cm.² The very hard, smooth, yellow disc thus obtained had the composition of the zinc chelate of 2,4,6-tris(2-hydroxyphenyl)-s-triazine of Example 1 and resembled in all respects the disc obtained by compression molding of the said chelate.

Example 3

A mixture consisting of 0.3 g. of the zinc salt of salicylonitrile and 2 g. of 2-phenoxybenzonitrile was intimately ground together in a mortar and compression molded in the high pressure apparatus described in Example 1 at a pressure of 7650 kg./cm.² and a maximum temperature of 265°–270° C. for 40 minutes. The molded, polymeric zinc chelate thus obtained was a smooth, yellow disc, 0.77 mm. thick and 9.55 mm. in diameter. Testing in the Instron Tensile Tester, employing a round-end indenter (1/16" radius) on the center gave a break force of 72 g. and a deflection of 0.2 mm. before rupture. The molded product resembles that obtained from the polymeric zinc chelate of 2,4-bis(2-hydroxyphenyl)-6-(2-phenoxyphenyl)-s-triazine.

Example 4

Into a one-liter flask were placed 5 g. (0.014 mole) of 2,4,6-tris(2-hydroxyphenyl)-s-triazine and 500 ml. of dioxane and the resulting mixture was heated until complete solution was attained. To the cooled solution was added a solution of 2.8 g. (0.014 mole) of cupric acetate monohydrate in 200 ml. of ethanol and 20 ml. of N,N-dimethylformamide. A copious green precipitate formed immediately. The reaction mixture was then heated at 60° C. for 15 minutes, with stirring, to assure complete reaction. The solid was filtered off on a Büchner funnel, washed several times with 100 ml. portions of ethanol, and dried in vacuo at 60° C. for several hours. The copper chelate, which was thus obtained in almost quantitative yield, was a green solid which did not melt at 360° C. and which analyzed 15.30% Cu as against 15.17%, the calculated value for $C_{21}H_{13}N_3O_3Cu$. It thus consisted essentially of the repeating unit of the type (I) above, wherein R and R' are hydrogen.

Example 5

To 10.7 g. (0.03 mole) of 2,4,6-tris(2-hydroxyphenyl)-s-triazine there was added 5 g. (0.06 mole) of anhydrous beryllium chloride. The mixture was heated under nitrogen, for 6 hours at an oil-bath temperature of 315°–330° C. It was then digested in a small amount of N,N-dimethylformamide, filtered, washed with acetone, and air-dried. The product was then boiled in alcohol to remove any unreacted beryllium chloride and then recrystallized by dissolving in excess boiling N,N-dimethylformamide and cooling to obtain the substantially pure chelate, a bright yellow solid which did not melt at 360° C., and which analyzed 3.5% Bé. as against 3.67%, the calculated value for $C_{12}H_{12}N_3O_3Bé_{1.5}$.

The analysis indicates a fully coordinated beryllium compound with 3/2 beryllium per triazine ring and, therefore, reaction at each hydroxy site. An analysis of 2.47% Bé. would be expected if only two hydroxy sites had reacted.

15
Example 6

Into a 125 ml. flask there were placed 1.071 g. of 2,4,6-tris(2-hydroxyphenyl)s-triazine and about 25 ml. of dimethylformamide. The mixture was heated until solution was complete, and then allowed to cool to room temperature. Another solution was prepared by heating a mixture of 0.750 g. of cobaltous acetate tetrahydrate and 25 ml. of methanol. This was also allowed to cool to room temperature after solution was complete. The solution of cobaltous acetate was then added to the solution of the 2,4,6-tris(2-hydroxyphenyl)-s-triazine. Precipitation occurred instantly. The whole was then heated gently for about 15 minutes, with occasional agitation, to ensure complete reaction. The precipitated solid was then filtered off, boiled in methanol to remove any cobaltous chloride, filtered and dried to give the substantially pure, rusty-brown, solid, polymeric chelate of cobalt, not melting at 360° C. and consisting essentially of the repeating unit:

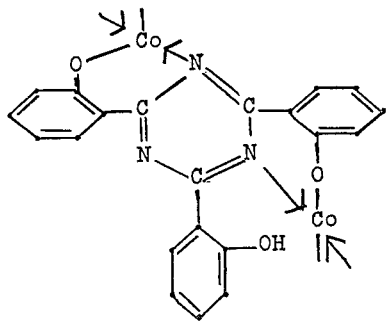

where each depicted dangling valence bond is satisfied by linkage to an oxygen atom of one of said repeating units and each depicted dangling coordinate bond is satisfied by linkage to a nitrogen atom of one of said repeating units.

Example 7

Employing the procedure described in Example 6, but using nickelous acetate tetrahydrate instead of the cobaltous salt of Example 6, there was obtained a virtually quantitative yield of the substantially pure, yellowish brown, solid polymeric chelate of nickel, not melting at 360° C., and consisting essentially of the repeating unit:

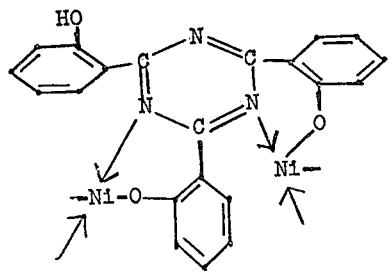

where each depicted dangling valence bond is satisfied by linkage to an oxygen atom of one of said repeating units and each depicted dangling coordinate bond is satisfied by linkage to a nitrogen atom of one of said repeating units.

Example 8

A solution of 1.071 g. (0.003 mole) of 2,4,6-tris(2-hydroxyphenyl)-s-triazine in 25 ml. of dimethylformamide was prepared by heating a mixture of the two. Lead acetonylacetonate (1.215 g., 0.003 mole) was heated in 35 ml. of methanol to the boiling point of the methanol, and while the resulting mixture was still warm (50° C.) it was mixed with the likewise warm solution of the 2,4,6-tris(2-hydroxyphenyl)-s-triazine. A completely clear solution occurred for just an instant. Then precipitation started, and the whole was gently heated to ensure complete reaction. The precipitate was filtered off and dried to obtain a quantitative yield of the substantially pure, yellow, solid, polymeric chelate, not melting at 360° C. and consisting essentially of the repeating unit:

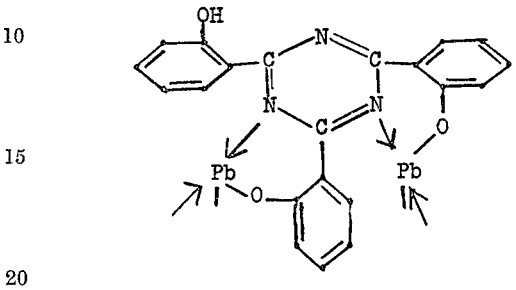

where each depicted dangling valence bond is satisfied by linkage to an oxygen atom of one of said repeating units and each depicted dangling coordinate bond is satisfied by linkage to a nitrogen atom of one of said repeating units.

Example 9

A hot solution of 1.071 g. of 2,4,6-tris(2-hydroxyphenyl)-s-triazine in 25 ml. of dimethylformamide was added to a hot solution of 0.759 g. of manganous acetylacetonate in 30 ml. of methanol. There resulted an almost black solution from which a deep red solid began to precipitate. The whole was heated gently for 15 minutes to ensure complete reaction. Filtration gave an excellent yield of the deep crimson, polymeric, solid chelate and a very small additional quantity of the chelate was obtained as residue from the filtrate by distilling the filtrate to remove the solvents, increasing the pot temperature to 250-280° C. until distillate no longer collected in the cooled receiver. The combined solids represented a quantitative yield of the polymeric manganese chelate, not melting at 360° C. and consisting essentially of the repeating unit:

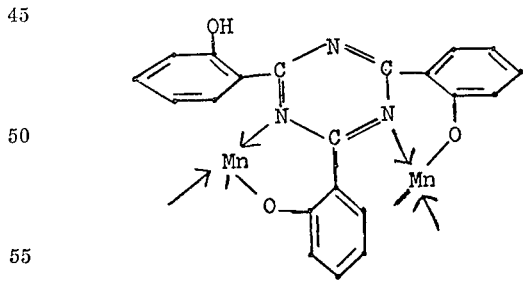

where each depicted dangling valence bond is satisfied by linkage to an oxygen atom of one of said repeating units and each depicted dangling coordinate bond is satisfied by linkage to a nitrogen atom of one of said repeating units.

Example 10

A mixture consisting of 1.071 g. of 2,4,6-tris(2-hydroxyphenyl)-s-triazine and 0.762 g. of ferrous acetylacetonate was heated in vacuo at 250-260° C. until no more liquid distilled and just as sublimation was noted at the upper portion of the reaction vessel, 20 ml. of dimethylformamide was added. The whole was then refluxed for 15 minutes. At the end of this time, the dimethylformamide was removed from the reaction mixture, first by distillation and finally by stripping off under vacuum at 250° C. There was thus obtained as residue the substantially pure, dark reddish-brown, solid, polymeric iron chelate, not melting at 360° C. and consisting essentially of the repeating unit:

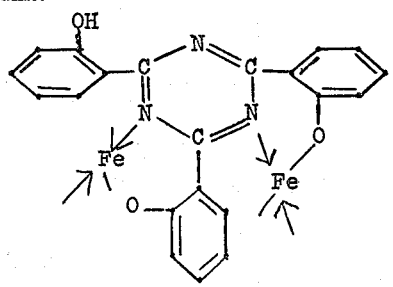

where each depicted dangling valence bond is satisfied by linkage to an oxygen atom of one of said repeating units and each depicted dangling coordinate bond is satisfied by linkage to a nitrogen atom of one of said repeating units.

*Example 11*

2,4,6-tris(2-hydroxyphenyl)-s-triazine (1.071 g., 0.003 mole) was dissolved in 25 ml. of hot dimethylformamide; and 0.663 g. (0.003 mole) of magnesium acetylacetonate was dissolved in 30 ml. of ethanol by heating. The respective solutions thus obtained were allowed to cool to room temperature and the solution of the magnesium compound was then added to the solution of said triazine compound. Immediate precipitation occurred. The solvents were stripped off, and the residue was heated under vacuum at 250–280° C. until no more liquid distilled. There was thus obtained as residue the substantially pure, yellow, solid polymeric magnesium chelate, not melting at 360° C. and consisting essentially of the repeating unit:

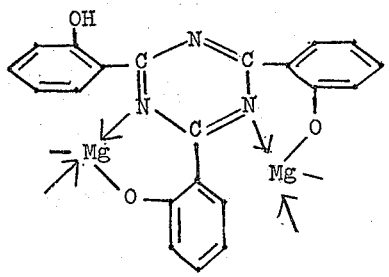

where each depicted dangling valence bond is satisfied by linkage to an oxygen atom of one of said repeating units and each depicted dangling coordinate bond is satisfied by linkage to a nitrogen atom of one of said repeating units.

*Example 12*

Acetic anhydride (2.7 cc.) was added to a mixture consisting of 10 g. of 2,4,6-tris(2-hydroxyphenyl)-s-triazine and 50 cc. of pyridine. The whole was stirred for 7 hours, and then allowed to stand overnight. The solution was poured into cold, 3 N hydrochloric acid. The off-white solid thus precipitated was extracted with chloroform, and the extracts washed with 3 N hydrochloric acid and with water, and dried over sodium sulfate. The dried material was concentrated to remove the chloroform and the concentrate was then diluted with petroleum ether to give a precipitate of a crude solid. This was fractionally crystallized from acetonitrile to give a first crop of crystals (A), and a second crop of crystals (B). Recrystallization of (A), first from benzene and then from acetonitrile-benzene gave the substantially pure 2-(2-acetoxyphenyl)-4,6-bis(2-hydroxyphenyl)-s-triazine, M.P. 202° C. and analyzing as follows:

|  | Found | Calcd. for $C_{23}H_{17}O_4N_3$ |
| --- | --- | --- |
| Percent C | 69.35 | 69.18 |
| Percent H | 4.30 | 4.29 |
| Percent N | 10.73 | 10.52 |

The second crop of crystals (B) was recrystallized, first from benzene-petroleum ether and then from benzene-ethanol to give the substantially pure 2,4-bis(2-acetoxyphenyl)-6-(2-hydroxyphenyl)-s-triazine, M.P. 136–137° C., and analyzing as follows:

|  | Found | Calcd. for $C_{25}H_{19}O_5N_3$ |
| --- | --- | --- |
| Percent C | 68.02 | 68.04 |
| Percent H | 4.34 | 4.53 |
| Percent N | 9.52 | 9.71 |

The copper chelate of the mono-acetyl derivative, i.e., the 2-(2-acetoxyphenyl)-4,6-bis(2-hydroxyphenyl)-s-triazine was prepared as follows: Into a 250 ml. flask were placed 500 mg. of said mono-acetyl derivative and 100 ml. of dioxane. The reaction mixture was heated until solution was complete. It was then allowed to cool to room temperature, and a solution of 0.25 g. cupric acetate mono-hydrate in 30 ml. of methanol was added with stirring. A green precipitate appeared instantly. After filtration and washing with alcohol and drying there was obtained a virtually quantitative yield of the green copper chelate, M.P. >360° C., analyzing 13.32% Cu as against 13.7%, the calculated value for $C_{23}H_{15}N_3O_4Cu$. Since the ratio of copper to triazine ring is 1:1, the present chelate has copper coordinated at both of the free hydroxy sites. Molding of the copper chelate in the high pressure apparatus described in Example 1 gives a hard, coherent molded piece of high thermal stability.

The copper chelate of the diacetyl derivative, i.e., the 2,4-bis(2-acetoxyphenyl)-6-(2-hydroxyphenyl)-s-triazine was prepared as follows: Into a 125 ml. flask were placed 1 g. of said diacetyl derivative and 40 ml. of absolute ethanol. After complete solution, 0.45 g. of cupric acetate monohydrate in 30 ml. of ethanol was added with stirring. The green precipitate was filtered, and the filtrate was concentrated to a small volume and yielded more solid. The combined solids were dried in vacuo at 60° C. to give the green copper chelate, melting above 360° C. and analyzing 6.79% copper. The fact that the copper value is this low indicates that not more than one coordination site is used in formation of the chelate, the copper content of the product indicating one copper atom per two triazines (theoretical for the 1:2 Cu:triazine compound product, $C_{25}H_{18}N_3O_5Cu_{0.5}$, is 6.75%).

*Example 13*

2,4,6-tris(2-hydroxy-3,5-dibromophenyl)-s-triazine was prepared by bromination of 2,4,6-tris(2-hydroxyphenyl)-s-triazine with excess bromine and using no solvent. After crystallization from N,N-dimethylformamide, the yellow solid melted at 355° C., as reported by Lindemann (Ann., 449, 73 (1929)).

Potassium phenate was prepared by heating a mixture of 50 g. of phenol and 14 g. of 85% potassium hydroxide pellets in toluene until water was completely removed, and then distilling off the toluene.

Powdered copper, to be employed as catalyst for reaction of the tripotassium salt with the potassium phenate was prepared as follows: A slightly acidified solution of copper sulfate was treated with oxide-free zinc dust while maintaining the temperature at below 40° C., the copper thus precipitated was collected, washed acid-free with water and then with acetone, and finally dried at about 100° C., substantially as described by P. H. Gore and G. K. Hughes, J. Chem. Soc. (1959), 1615.

A mixture consisting of the above-prepared potassium phenate, 13 g. of the copper catalyst prepared above and 30 ml. of diglyme solvent was heated to 165–185° C. under nitrogen and 13 g. of the above-prepared 2,4,6-tris(2-hydroxy-3,5-dibromophenyl)-s-triazine was added to the hot mixture over an hour with rapid stirring. The resulting reaction mixture was heated overnight at 200°

C., and finally for 3 hours at 230° C. It was then cooled and filtered. The filtered solid was washed with toluene, the toluene washings were combined with the filtrate, and the combined material was washed with dilute hydrochloric acid and twice with water and finally dried over magnesium sulfate. Concentration almost to dryness and trituration with ethanol gave the yellow, solid 2,4,6-tris(3,5-diphenoxy-2-hydroxyphenyl)-s-triazine, M.P. 195–198° C., and analyzing as follows:

|  | Found | Calcd. for $C_{57}H_{39}N_3O_9$ |
|---|---|---|
| Percent C | 75.4 | 75.2 |
| Percent H | 4.4 | 4.32 |
| Percent N | 4.5 | 4.62 |

The zinc chelate of the 2,4,6-tris(3,5-diphenoxy-2-hydroxyphenyl)-s-triazine was prepared as follows: To 1 g. of the chelate dissolved in 5 ml. of warm benzene there was added 362 mg. of zinc acetate dihydrate dissolved in 30 ml. of absolute ethanol. A copious, brownish-yellow precipitate appeared immediately. After digesting the reaction mixture for 15 minutes on the hot plate, the solid was filtered on the Büchner funnel, washed twice with warm ethanol, and dried to give the substantially pure chelate, M.P. 320° C.–330° C., and analyzing 8.71% zinc. The calculated value for the zinc content of a polymeric zinc chelate of 2,4,6-tris(3,5-diphenoxy-2-hydroxyphenyl)-s-triazine wherein zinc is at each of the 3 coordination sites, i.e., having 1.5 atoms of zinc per triazine, is 9.75%.

The above prepared zinc chelate was mixed in a 1:1 ratio with the zinc chelate of Example 1, i.e., of the 2,4,6-tris(2-hydroxyphenyl)-s-triazine and molded in the Bridgman apparatus described in Example 1 at a pressure of 8900 kg./cm.$^2$ and a temperature of up to 350° C. The apparatus was allowed to cool under pressure. The molded product was a hard, shiny brown disc, 0.25 mm. thick.

The zinc chelate of this example, i.e., of 2,4,6-tris(3,5-diphenoxy-2-hydroxyphenyl)-s-triazine was also used in a molding procedure calculated to give in situ, a molded product consisting of said diphenoxy chelate and the chelate of 2,4,6-tris(2-hydroxyphenyl)-s-triazine. In this experiment, the zinc chelate of the present diphenoxy compound was mixed with salicylonitrile and with 3 times the quantity of zinc oxide calculated to give the chelate of 2,4,6-tris(2-hydroxyphenyl)-s-triazine, the excess of zinc oxide being employed for the purpose of effecting bonding between the 2 different chelates. The thoroughly ground mixture was molded in the Bridgman apparatus of Example 1 at 12,700 kg./cm.$^2$ of pressure and a temperature of 250° C. Under these conditions, the salicylonitrile trimerized to the 2,4,6-tris(2-hydroxyphenyl)-s-triazine, and the zinc oxide reacted with the latter to form its zinc chelate. The molded product was a coherent, smooth disc which was resistant to hot acetone.

*Example 14*

A mixture consisting of 60 g. of m-phenoxyphenol and 20 g. of 85% potassium hydroxide pellets in 50 ml. of toluene was heated until all the water was removed. Freshly prepared copper catalyst (8.3 g.), prepared as in Example 1, was then added to the resulting phenate and the toluene distilled off. The residue was heated under nitrogen to 130° C., and 8.31 g. (0.01 mole) of 2,4,6-tris(2-hydroxy-3,5-dibromophenyl)-s-triazine was added thereto over an hour period, with rapid stirring. The whole was then heated for 5 hours under nitrogen at 240–250° C. (oil bath temperature) while continuing the rapid stirring. After being allowed to cool overnight, the resulting deep, red-brown, solid mass was dissolved in hot diglyme and filtered to remove copper catalyst. The filtered catalyst was washed with diglyme and the washings were added to the filtrate. The combined material was washed once with dilute hydrochloric acid, twice with water, and finally dried over anhydrous magnesium sulfate. Distillation of the dried product to remove material boiling below 155° C./1.8–2.0 mm., gave as residue the substantially pure 2,4,6-tris[2-hydroxy-3,5-bis(4-phenoxyphenoxy)phenyl]-s-triazine.

*Example 15*

To a cold (5° C.) solution consisting of 10 g. of tris(2-hydroxyphenyl)-s-triazine and 48 g. of sodium hydroxide in 120 ml. of water and 150 ml. of ethanol there was added, dropwise, 35 cc. of dimethyl sulfate. As the last 10 cc. of the sulfate was added, the reaction became exothermic. When all of the sulfate had been added, cooling was discontinued and the reaction was allowed to proceed to complete solution. After standing for about 30 minutes, the reaction mixture was treated with about 1 liter of water, whereupon flocculent precipitation occurred. The solid was filtered off, washed with ether and dried to give the substantially pure 2,4-bis(2-hydroxyphenyl)-6-(2-methoxyphenyl)-s-triazine, M.P. 166–167° C., and analyzing as follows:

|  | Found | Calcd. for $C_{22}H_{17}N_3O_3$ |
|---|---|---|
| Percent C | 71.2 | 71.15 |
| Percent H | 4.5 | 4.62 |
| Percent N | 11.3 | 11.32 |
| Percent—OCH$_3$ | 8.0 | 8.35 |

The above-prepared 2,4-bis(2-hydroxyphenyl)-6-(2-methoxyphenyl)-s-triazine was converted to its copper chelate as follows: Said triazine compound (0.5 g.) was warmed in 70 ml. of dioxane to complete solution, and the solution was allowed to cool to room temperature. To the solution there was then added 250 mg. of cupric acetate monohydrate dissolved in 30 ml. of ethanol. The green, flocculent precipitate which resulted was separated in the centrifuge, washed with absolute ethanol, filtered and dried in vacuo at 60° C. for 1 hour to give a quantitative yield of polymeric copper chelate which analyzed as follows:

|  | Found | Calcd. for $C_{22}H_{15}N_3O_3Cu$ |
|---|---|---|
| Percent Cu | 14.53 | 14.68 |
| Percent—OCH$_3$ | 8.2 | 8.35 |

The polymeric chelate thus had an average of one copper atom and one methoxy radical per triazine unit. It was insoluble in water and in most organic solvents and is not affected by heat at temperatures of up to 300° C. It was molded under high pressure to give highly heat-resistant, translucent molded pieces of good mechanical strength and dimensional stability.

What we claim is:

1. An organometallic, polymeric chelate consisting essentially of a unit selected from the class consisting of (I), the repeating unit:

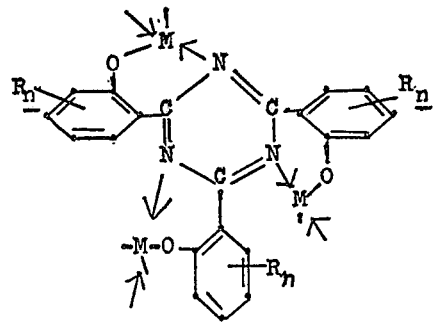

(II), the repeating unit:

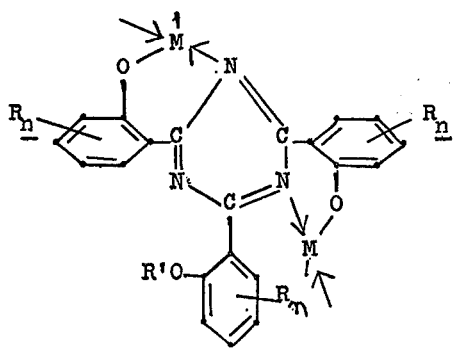

and (III), the repeating unit:

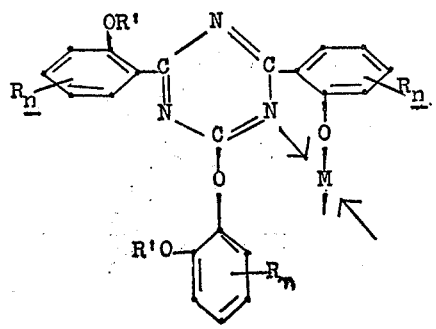

wherein R is selected from the class consisting of alkyl radicals of from 1 to 5 carbon atoms, alkoxy and alkoxyalky radicals of from 1 to 6 carbon atoms, and phenoxy and phenoxyphenoxy radicals and such radicals having an alkyl radical of from 1 to 5 carbon atoms substituted at a benzene ring thereof; R' is selected from the class consisting of hydrogen, alkyl radicals of from 1 to 5 carbon atoms, the phenyl and phenoxyphenyl radicals and such radicals having an alkyl radical of from 1 to 5 carbon atoms substituted at a benzene ring thereof, alkanoyl radicals of from 2 to 6 carbon atoms, the benzoyl radical, and alkylbenzoyl radicals having from 1 to 5 carbon atoms in the alkyl radical; $n$ is a number of 0 to 2; M is a bivalent tetracoordinating metal ion, and each depicted dangling valence bond is satisfied by linkage to an oxygen atom of one of the repeating units (I)–(III), and each depicted dangling coordinate bond is satisfied by linkage to a nitrogen atom of the repeating units (I)–(III).

2. An organometallic, polymeric chelate consisting essentially of the repeating unit:

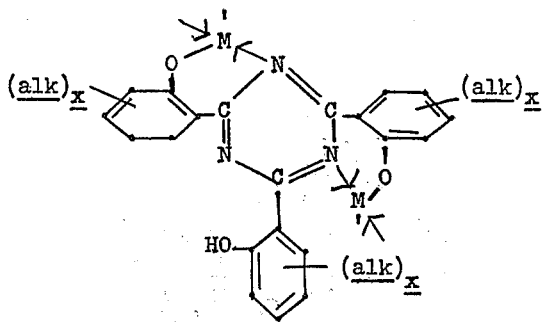

wherein M is a bivalent tetracoordinating metal ion, $x$ is a number of 0 to 2, alk denotes an alkyl radical of from 1 to 5 carbon atoms, and each depicted dangling valence bond is satisfied by linkage to an oxygen atom of said repeating units, and each depicted dangling coordinate bond is satisfied by linkage to a nitrogen atom of one of said repeating units.

3. An organometallic, polymeric chelate consisting essentially of the repeating unit:

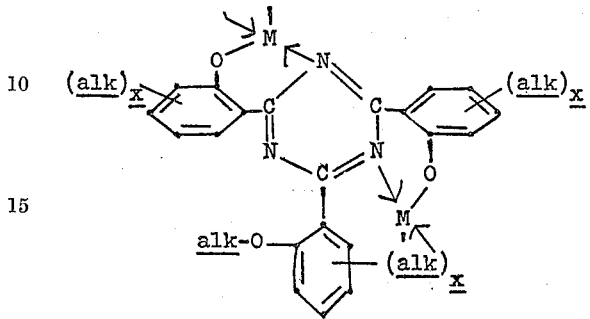

wherein M is a bivalent tetracoordinating metal ion, $x$ is a number of 0 to 2, alk denotes an alkyl radical of from 1 to 8 carbon atoms, and each depicted dangling valence bond is satisfied by linkage to an oxygen atom of one of said repeating units, and each depicted dangling coordinate bond is satisfied by linkage to a nitrogen atom of one of said repeating units.

4. An organometallic, polymeric chelate consisting essentially of the repeating unit:

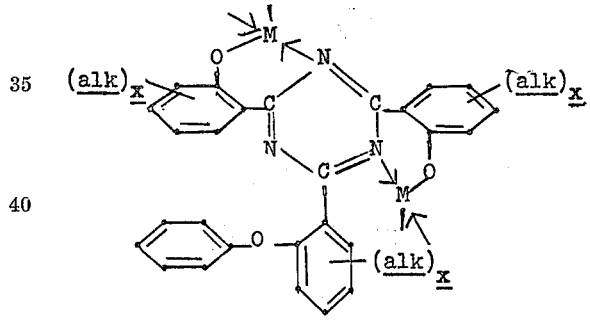

wherein M is a bivalent tetracoordinating metal ion, $x$ is a number of 0 to 2, alk denotes an alkyl radical of from 1 to 5 carbon atoms, and each depicted dangling valence bond is satisfied by linkage to an oxygen atom of one of the repeating units, and each depicted dangling coordinate bond is satisfied by linkage to a nitrogen atom of one of the repeating units.

5. An organometallic, polymeric chelate consisting essentially of the repeating unit:

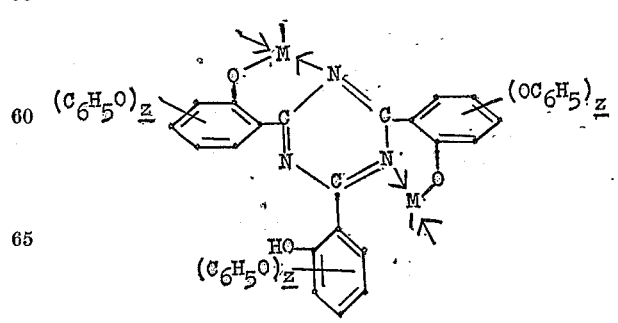

wherein M is a bivalent tetracoordinating metal ion, $z$ is a number of 1 to 2, $C_6H_5$ denotes the phenyl radical, and each depicted dangling valence bond is satisfied by linkage to an oxygen atom of one of said repeating units, and each depicted dangling coordinate bond is satisfied by linkage to a nitrogen atom of one of said repeating units.

6. An organometallic, polymeric chelate consisting essentially of the repeating unit:

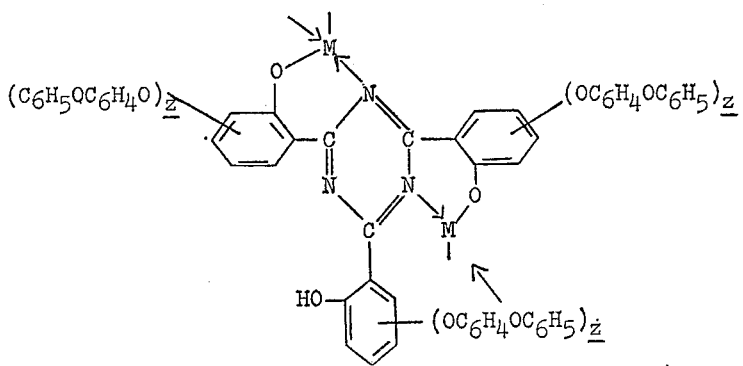

wherein M is a bivalent tetracoordinating metal ion, z is a number of 1 to 2, $C_6H_5$ denotes the phenyl radical and $C_6H_4$ denotes the phenylene radical, and each depicted dangling valence bond is satisfied by linkage to an oxygen atom of one of said repeating units, and each depicted danging coordinate bond is satisfied by linkage to a nitrogen atom of one of said repeating units.

7. An organometallic polymeric chelate consisting essentially of the repeating unit:

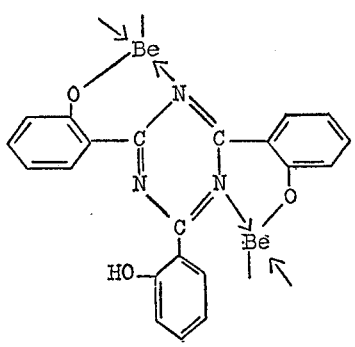

wherein each depicted dangling valence bond is satisfied by linkage to an oxygen atom of one of said repeating units, and each depicted dangling coordinate bond is satisfied by linkage to a nitrogen atom of one of said repeating units.

8. An organometallic polymeric chelate consisting essentially of the repeating unit:

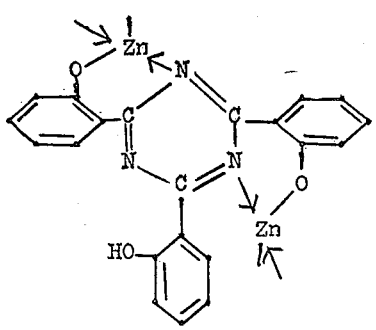

wherein each depicted dangling valence bond is satisfied by linkage to an oxygen atom of one of said repeating units, and each depicted dangling coordinate bond is satisfied by linkage to a nitrogen atom of one of said repeating units.

9. An organometallic polymeric chelate consisting essentially of the repeating unit:

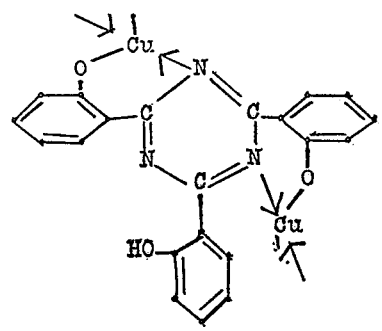

wherein each depicted dangling valence bond is satisfied by linkage to an oxygen atom of one of said repeating units, and each depicted dangling coordinate bond is satisfied by linkage to a nitrogen atom of one of said repeating units.

10. An organometallic polymeric chelate consisting essentially of the repeating unit:

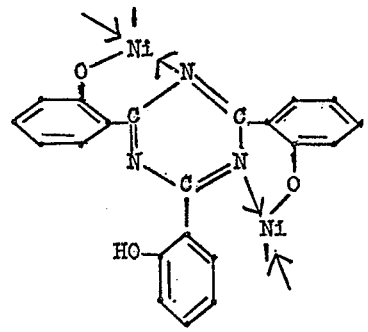

wherein each depicted dangling valence bond is satisfied by linkage to an oxygen atom of one of said repeating units, and each depicted dangling coordinate bond is satisfied by linkage to a nitrogen atom of one of said repeating units.

11. An organometallic polymeric chelate consisting essentially of the repeating unit:

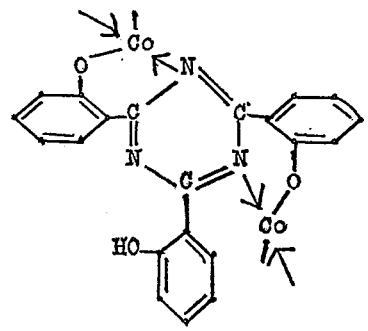

wherein each depicted dangling valence bond is satisfied by linkage to an oxygen atom of one of said repeating units, and each depicted dangling coordinate bond is satisfied by linkage to a nitrogen atom of one of said repeating units.

12. An organometallic polymeric chelate consisting essentially of the repeating unit:

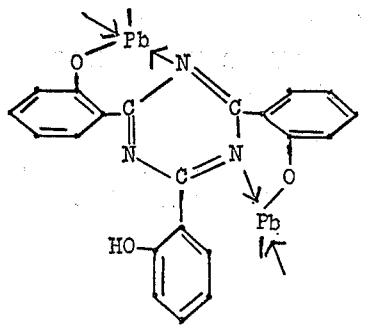

wherein each depicted dangling valence bond is satisfied by linkage to an oxygen atom of one of said repeating units, and each depicted dangling coordinate bond is satisfied by linkage to a nitrogen atom of one of said repeating units.

13. An organometallic polymeric chelate consisting essentially of the repeating unit:

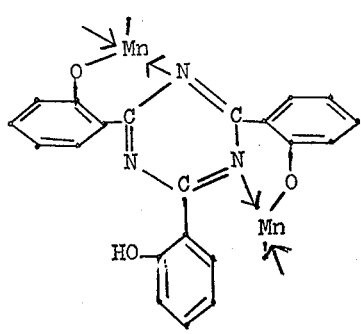

wherein each depicted dangling valence bond is satisfied by linkage to an oxygen atom of one of said repeating units, and each depicted dangling coordinate bond is satisfied by linkage to a nitrogen atom of one of said repeating units.

14. An organometallic polymeric chelate consisting essentially of the repeating unit:

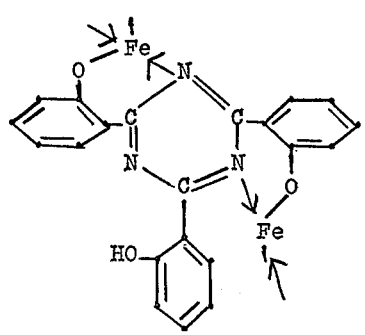

wherein each depicted dangling valence bond is satisfied by linkage to an oxygen atom of one of said repeating units, and each depicted dangling coordinate bond is satisfied by linkage to a nitrogen atom of one of said repeating units.

15. An organometallic polymeric chelate consisting essentially of the repeating unit:

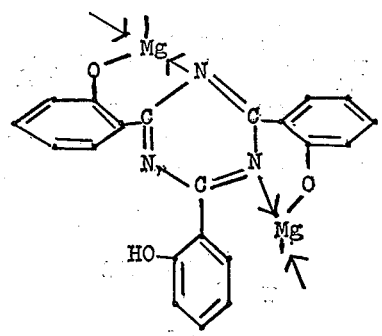

wherein each depicted dangling valence bond is satisfied by linkage to an oxygen atom of one of said repeating units, and each depicted dangling coordinate bond is satisfied by linkage to a nitrogen atom of one of said repeating units.

16. A polymeric chelate of a bivalent, tetracoordinating metal and a tris(hydroxyaryl)-s-triazine having at least one hydroxy radical in the ortho-position and from 6 to 12 carbon atoms in the aryl radical.

17. The process of preparing a polymeric, organometallic chelate which comprises heating a mixture of (I) a metal compound selected from the class consisting of the oxides, salts of and acylacetonates of a bivalent tetracoordinating metal, and (II) a hydroxyphenyltriazine compound of the formula

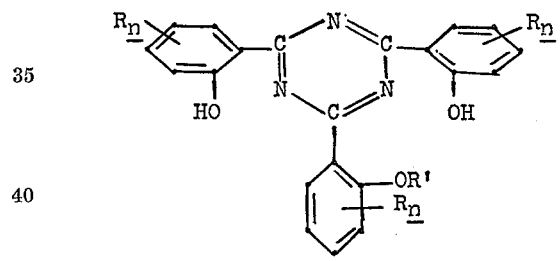

wherein R is selected from the class consisting of alkyl radicals of from 1 to 5 carbon atoms, alkoxy and alkoxyalkoxy radicals of from 1 to 6 carbon atoms, and phenoxy and phenoxyphenoxy radicals and such radicals having an alkyl radical of from 1 to 5 carbon atoms substituted at a benzene ring thereof; R' is selected from the class consisting of hydrogen, alkyl radicals of from 1 to 5 carbon atoms, the phenyl and phenoxyphenyl radicals and such radicals having an alkyl radical of from 1 to 5 carbon atoms substituted at a benzene ring thereof, alkanoyl radicals of from 2 to 6 carbon atoms, the benzoyl radical and alkylbenzoyl radicals having from 1 to 5 carbon atoms in the alkyl radical, and $n$ is a number of 0 to 2.

18. The process of preparing a polymeric organometallic chelate which comprises heating under pressure a mixture of the salt of the formula

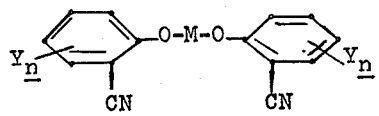

wherein Y is selected from the class consisting of hydrogen and alkyl and alkoxy radicals of from 1 to 5 carbon atoms and M is a bivalent tetracoordinating metal ion with a nitrile of the formula

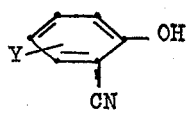

in which Y is as above defined.

19. The process of preparing a polymeric organometallic chelate which comprises heating under pressure a mixture of the salt of the formula

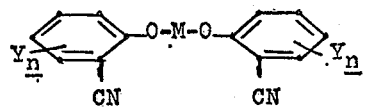

wherein Y is selected from the class consisting of hydrogen and alkyl and alkoxy radicals of from 1 to 5 carbon atoms and M is a bivalent tetracoordinating metal ion with an ether of a hydroxy nitrile of the formula

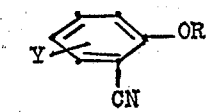

in which Y is as above defined and R is selected from the class consisting of alkyl radicals of from 1 to 5 carbon atoms, the phenyl and phenoxyphenyl radicals and such radicals having an alkyl radical of from 1 to 5 carbon atoms substituted at a benzene ring thereof.

References Cited by the Examiner
UNITED STATES PATENTS
2,933,474   4/60   Handy et al. _____ 260—438

OTHER REFERENCES
Berlin et al., Chem. Abstract, vol. 54, page 16370$f$, 1960.

MURRAY TILLMAN, *Primary Examiner.*
HAROLD N. BURSTEIN, *Examiner.*